(12) United States Patent
Yamada

(10) Patent No.: US 11,119,311 B2
(45) Date of Patent: Sep. 14, 2021

(54) ACTUATOR AND OPTICAL SCANNING DEVICE

(71) Applicant: Kensuke Yamada, Tokyo (JP)

(72) Inventor: Kensuke Yamada, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 102 days.

(21) Appl. No.: 16/295,398

(22) Filed: Mar. 7, 2019

(65) Prior Publication Data

US 2019/0285873 A1   Sep. 19, 2019

(30) Foreign Application Priority Data

Mar. 14, 2018   (JP) .............................. JP2018-046244

(51) Int. Cl.
*G02B 26/08* (2006.01)
*G02B 26/10* (2006.01)

(52) U.S. Cl.
CPC ......... *G02B 26/0858* (2013.01); *G02B 26/10* (2013.01)

(58) Field of Classification Search
CPC .. G02B 26/0858; G02B 26/10; G02B 26/105; G02B 26/101; G02B 26/0833–0866; B81B 3/0045; B81B 7/0006; B81B 7/02; B81B 2203/0163; B81B 3/0035–0048; B81B 7/008; B81B 2201/042; B81B 2201/047

See application file for complete search history.

(56) References Cited

U.S. PATENT DOCUMENTS

| 2009/0059344 | A1* | 3/2009 | Marxer ............. G02B 26/0841 359/290 |
| 2014/0071507 | A1* | 3/2014 | Aimono ............ G02B 26/0858 359/199.4 |
| 2014/0118005 | A1* | 5/2014 | Heinzelmann ......... B81B 7/008 324/613 |
| 2015/0116803 | A1 | 4/2015 | Horie et al. |
| 2016/0116733 | A1* | 4/2016 | Yamada ............. G02B 26/0858 359/213.1 |
| 2018/0290881 | A1 | 10/2018 | Yamada et al. |

FOREIGN PATENT DOCUMENTS

| JP | 2008040240 A | * | 2/2008 |
| JP | 2013-186145 | | 9/2013 |
| JP | 2016-001325 | | 1/2016 |
| JP | 2017-068205 | | 4/2017 |

* cited by examiner

*Primary Examiner* — Kimberly N. Kakalec
(74) *Attorney, Agent, or Firm* — IPUSA, PLLC

(57) ABSTRACT

An actuator includes a driving beam that includes a beam extending in a direction orthogonal to a predetermined axis and supports an object to be driven; a driving source that is formed on a surface of the beam and causes the object to rotate around the predetermined axis; a sensor beam that extends in a direction that is the same as the direction in which the beam extends, one end of the sensor beam being connected to a lateral side of the beam; and a sensor that is formed on a surface of the sensor beam, the surface of the sensor beam and the surface of the beam facing the same direction.

9 Claims, 11 Drawing Sheets

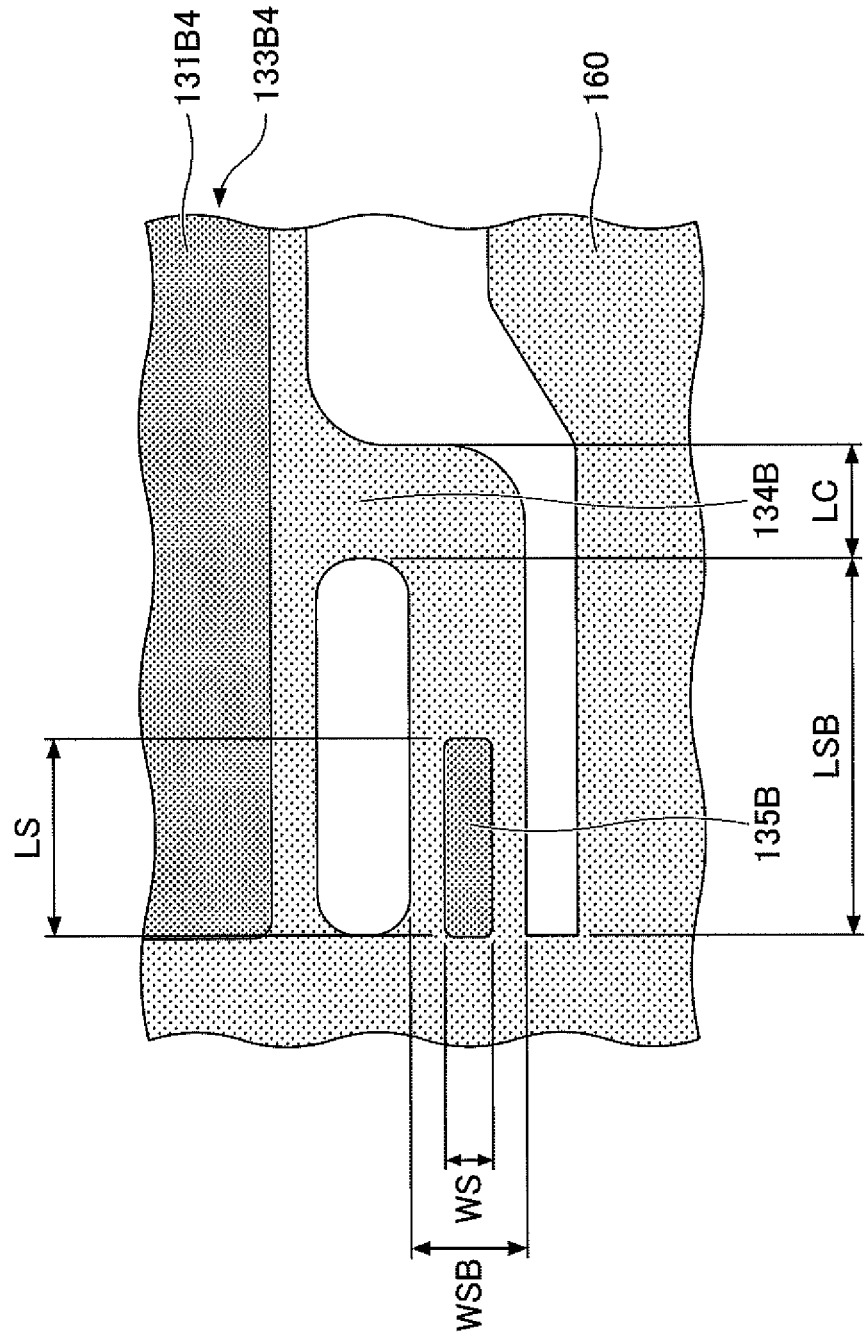

1135A    1131A    1133A 1135B  1133BX    1131B    1133B 135B  134B                    131B4      133B4

ACTUATOR AND OPTICAL SCANNING DEVICE

CROSS-REFERENCE TO RELATED APPLICATION

The present application is based upon and claims priority to Japanese Patent Application No. 2018-046244, filed on Mar. 14, 2018, the entire contents of which are incorporated herein by reference.

BACKGROUND OF THE INVENTION

1. Field of the Invention

An aspect of this disclosure relates to an actuator and an optical scanning device.

2. Description of the Related Art

There is a known optical scanning device where a mirror is rotated around a rotational axis to scan light reflected by the mirror by using an actuator including, as a driving source, a piezoelectric element that includes an upper electrode formed on the upper surface of a piezoelectric thin film and a lower electrode formed on the lower surface of the piezoelectric thin film. The actuator also includes an upper wire connected to the upper electrode and a lower wire connected to the lower electrode that are used to apply a voltage to the piezoelectric thin film (see, for example, Japanese Laid-Open Patent Publication No. 2016-001325 and Japanese Patent No. 5876329).

The actuator includes a Micro Electro Mechanical Systems (MEMS) structure for rotating the mirror around the rotational axis, and the MEMS structure greatly deforms in the thickness direction. The MEMS structure may be implemented by a bellows structure to reduce the rigidity in the thickness direction while maintaining the rigidity in the in-plane direction. Also, the actuator may include a torsion bar as the MEMS structure and may be configured to use torsion of the torsion bar to rotate the mirror around the rotational axis.

The actuator described above may further include a sensor piezoelectric element that is provided on a driving beam of the MEMS structure and used to detect the movement and warp of the driving beam (see, for example, Japanese Laid-Open Patent Publication NO. 2017-068205). For example, when a sensor piezoelectric element is provided on a driving beam, the sensor piezoelectric element is formed in a sensor area formed by removing a portion of a driving piezoelectric element.

Because the sensor area is formed by etching a portion of the driving piezoelectric element, the size of the sensor area tends to become greater than the size of the sensor piezoelectric element. This does not cause any problem when the driving piezoelectric element has a sufficiently-large width relative to the size of the sensor area.

However, when a sensor piezoelectric element is provided in a sensor area formed by removing a portion of a narrow driving piezoelectric element formed on a narrow driving beam, almost no area is left for the driving piezoelectric element around the sensor piezoelectric element. As a result, a portion of the driving beam around the sensor piezoelectric element does not warp, and the sensor piezoelectric element cannot detect any warp of the driving beam.

If the widths of the driving beam and the driving piezoelectric element are increased to solve the above problem, the width of other driving beams of the bellows structure also needs to be increased to obtain balanced sensitivity, and therefore the size of the entire actuator increases. Also, if the width of only a portion of the driving beam on which the sensor piezoelectric element is formed is increased, the rigidity of only the portion of the driving beam increases, the deformation of the portion of the driving beam decreases, and the sensor output decreases.

SUMMARY OF THE INVENTION

In an aspect of this disclosure, there is provided an actuator including a driving beam that includes a beam extending in a direction orthogonal to a predetermined axis and supports an object to be driven; a driving source that is formed on a surface of the beam and causes the object to rotate around the predetermined axis; a sensor beam that extends in a direction that is the same as the direction in which the beam extends, one end of the sensor beam being connected to a lateral side of the beam; and a sensor that is formed on a surface of the sensor beam, the surface of the sensor beam and the surface of the beam facing the same direction.

BRIEF DESCRIPTION OF THE DRAWINGS

FIG. 4B is an enlarged view of a portion of the optical scanner of FIG. 4A;

DESCRIPTION OF THE PREFERRED EMBODIMENTS

Embodiments of the present invention are described below with reference to the accompanying drawings. Throughout the accompanying drawings, the same reference numbers are used for the same components, and repeated descriptions of those components may be omitted.

Embodiment

Figure 1A:
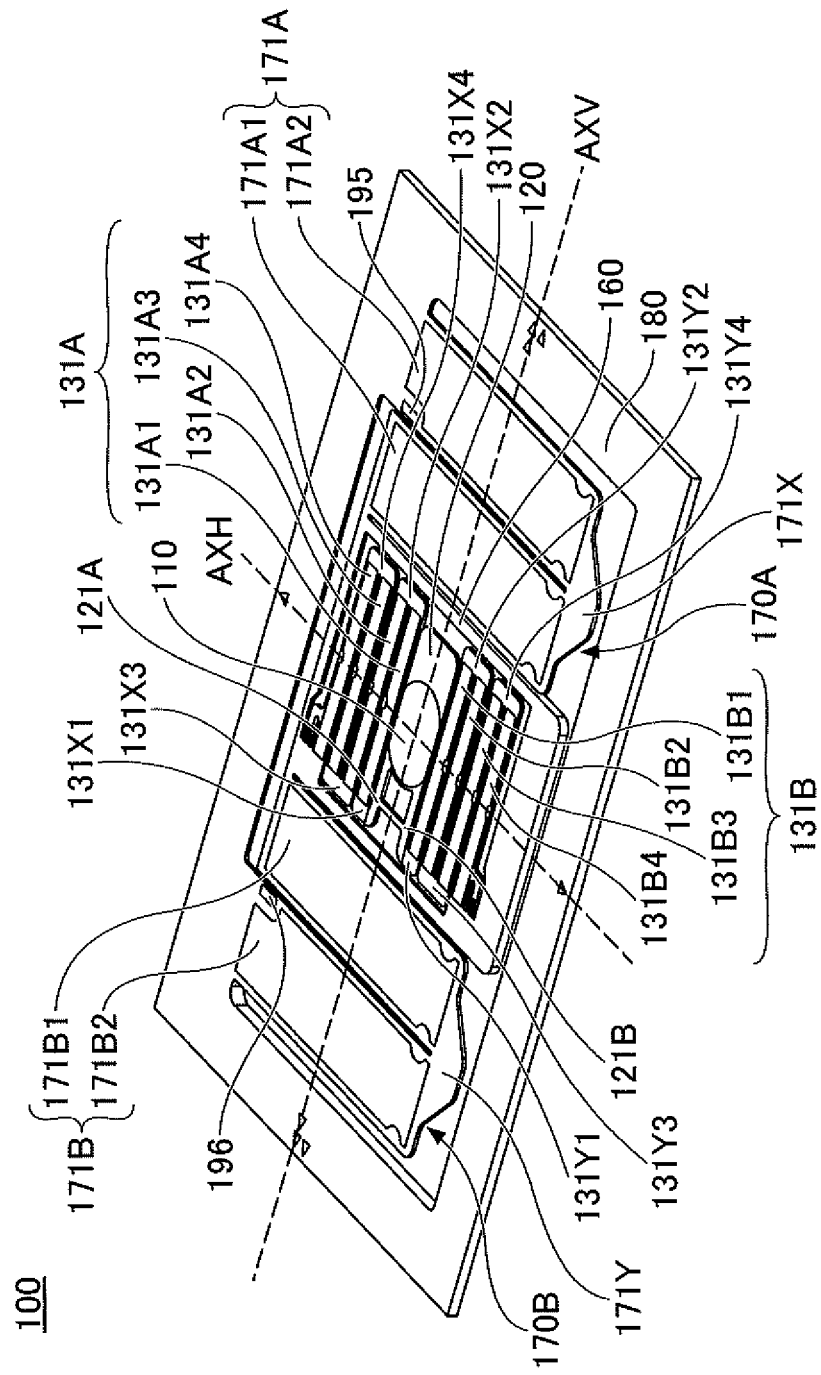
FIG. 1A is a top perspective view of an optical scanner of an optical scanning device according to an embodiment.
Figure 1B:
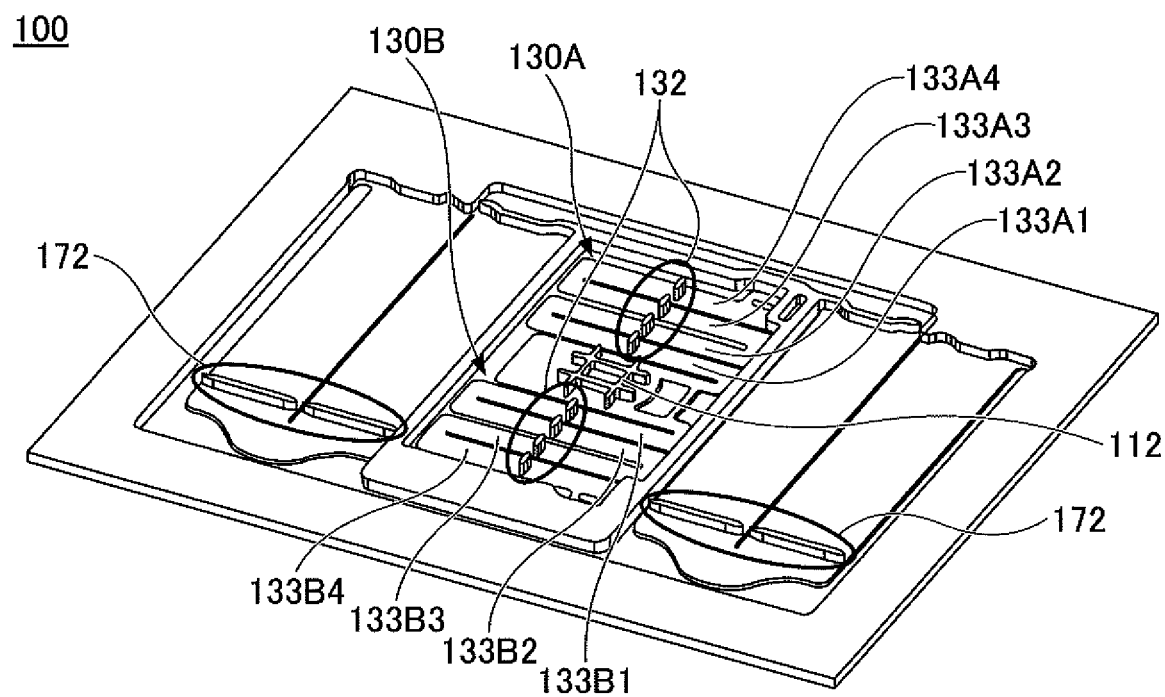
FIG. 1B is a bottom perspective view of the optical scanner of FIG. 1A.
Figure 2:
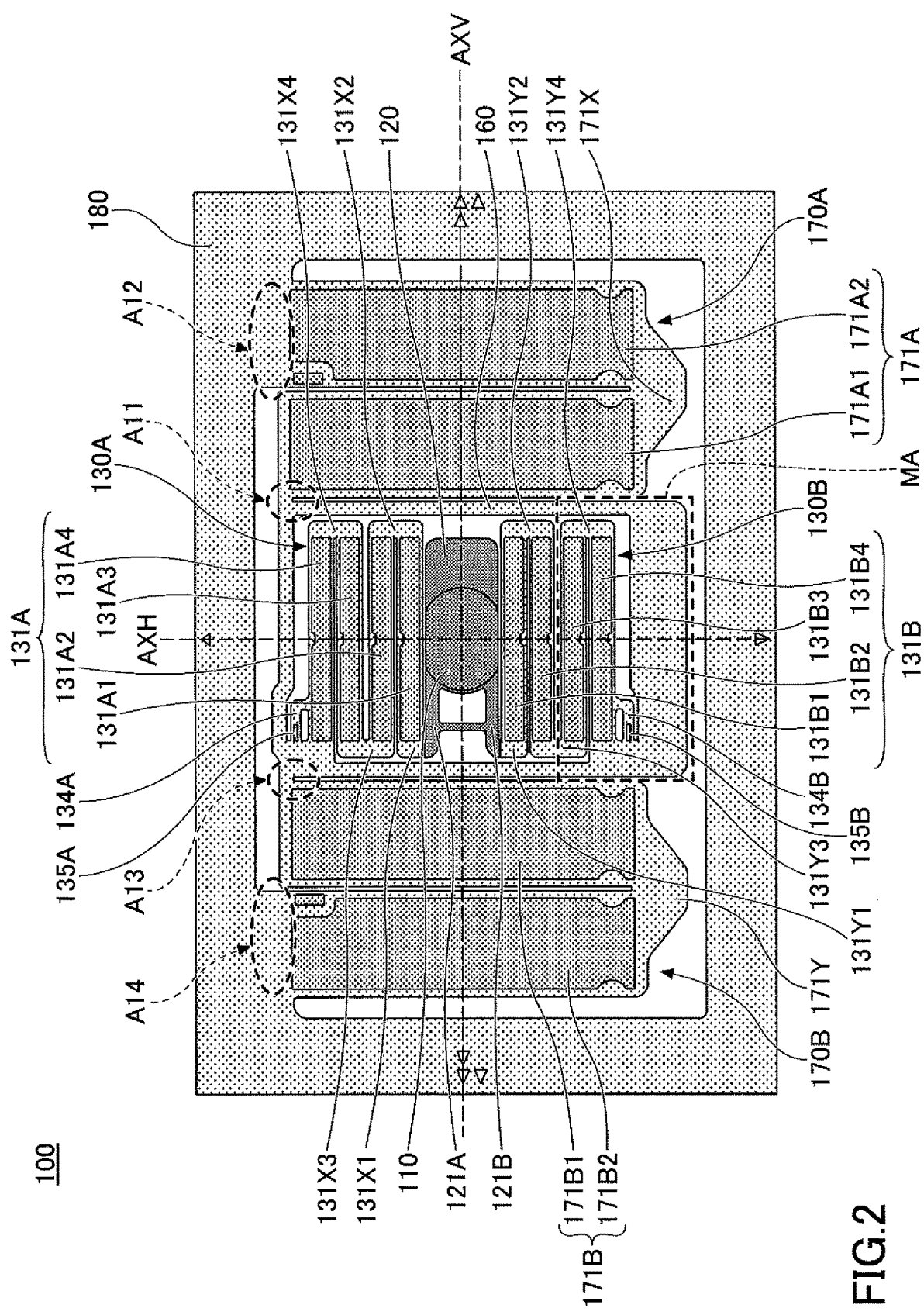
FIG. 2 is a top plan view of the optical scanner of FIG. 1A.

FIG. 1A is a top perspective view of an optical scanner 100 of an optical scanning device according to an embodiment. FIG. 1B is a bottom perspective view of the optical scanner 100 of FIG. 1A. FIG. 2 is a top plan view of the optical scanner 100 of FIG. 1A. The optical scanner 100 may be housed in a ceramic package including a package body and a package cover.

The optical scanner 100 scans an incoming laser beam emitted by a light source by causing a mirror 110 to rotate (or oscillate). The optical scanner 100 is, for example, a MEMS mirror where the mirror 110 is driven by driving sources such as piezoelectric elements. The mirror 110 of the optical scanner 100 reflects an incoming laser beam and scans the reflected laser beam two-dimensionally.

As illustrated in FIGS. 1A, 1B, and 2, the optical scanner 100 includes the mirror 110, a mirror support 120, coupling beams 121A and 121B, horizontal driving beams 130A and 130B, a movable frame 160, vertical driving beams 170C and 170D, and a fixed frame 180. The mirror 110 is disposed on an upper surface of the mirror support 120.

The horizontal driving beams 130A and 130B for supporting the mirror 110 and the mirror support 120 are connected to the mirror support 120 and disposed on the corresponding sides of the mirror support 120 supporting the mirror 110. The horizontal driving beams 130A and 130B are connected to the mirror support 120 via the coupling beams 121A and 121B. The horizontal driving beams 130A and 130B, the coupling beams 121A and 121B, the mirror support 120, and the mirror 110 are supported by the movable frame 160 surrounding these components. The horizontal driving beam 130A includes multiple rectangular horizontal beams 133A1, 133A2, 133A3, and 133A4 that extend in the direction of a vertical-rotation axis AXV that is orthogonal to a horizontal-rotation axis AXH, and ends of adjacent horizontal beams are connected to each other via turnaround parts 131X2, 131X3, and 131X4 such that the horizontal driving beam 130A forms a zig-zag bellows structure as a whole. One end of the horizontal driving beam 130A is connected to the inner side of the movable frame 160, and another end of the horizontal driving beam 130A is connected via a turnaround part 131X1 and the coupling beam 121A to the mirror support 120. The horizontal driving beam 130B includes multiple rectangular horizontal beams 133B1, 133B2, 133B3, and 133B4 that extend in the direction of the vertical-rotation axis AXV that is orthogonal to the horizontal-rotation axis AXH, and ends of adjacent horizontal beams are connected to each other via turnaround parts 131Y2, 131Y3, and 131Y4 such that the horizontal driving beam 130B forms a zig-zag bellows structure as a whole. One end of the horizontal driving beam 130B is connected to the inner side of the movable frame 160, and another end of the horizontal driving beam 130B is connected via a turnaround part 131Y1 and the coupling beam 121B to the mirror support 120.

The vertical driving beams 170A and 170B connected to the movable frame 160 are disposed on the corresponding sides of the movable frame 160. The vertical driving beam 170A includes multiple rectangular vertical beams that extend in the direction of the horizontal-rotation axis AXH, and ends of adjacent vertical beams are connected to each other via a turnaround part 171X such that the vertical driving beam 170A forms a zig-zag bellows structure as a whole. One end of the vertical driving beam 170A is connected to the inner side of the fixed frame 180, and another end of the vertical driving beam 170A is connected to the outer side of the movable frame 160. The vertical driving beam 170B includes multiple rectangular vertical beams that extend in the direction of the horizontal-rotation axis AXH, and ends of adjacent vertical beams are connected to each other via a turnaround part 171Y such that the vertical driving beam 170B forms a zig-zag bellows structure as a whole. One end of the vertical driving beam 170B is connected to the inner side of the fixed frame 180, and another end of the vertical driving beam 170B is connected to the outer side of the movable frame 160.

The horizontal driving beams 130A and 130B include, respectively, horizontal driving sources 131A and 131B that are piezoelectric elements. Also, the vertical driving beams 170A and 170B include, respectively, vertical driving sources 171A and 171B that are piezoelectric elements. The horizontal driving beams 130A and 130B and the vertical driving beams 170A and 170B function as an actuator that causes the mirror 110 to rotate (or oscillate) around the horizontal-rotation axis AXH and the vertical-rotation axis AXV to scan a laser beam. In the descriptions below, driving sources such as horizontal driving sources implemented by piezoelectric elements may be referred to as driving piezoelectric elements.

On the upper surfaces of the horizontal driving beams 130A and 130B, the horizontal driving sources 131A and 131B are formed for respective horizontal beams 133A1, 133A2, 133A3, 133A4, 133B1, 133B2, 133B3, 133B4 that are rectangular units including no curved section. Each of the horizontal driving sources 131A is a piezoelectric element formed on the upper surface of the horizontal driving beam 130A and includes a piezoelectric thin film, an upper electrode formed on the upper surface of the piezoelectric thin film, and a lower electrode formed on the lower surface of the piezoelectric thin film. Each of the horizontal driving sources 131B is a piezoelectric element formed on the upper surface of the horizontal driving beam 130B and includes a piezoelectric thin film, an upper electrode formed on the upper surface of the piezoelectric thin film, and a lower electrode formed on the lower surface of the piezoelectric thin film.

In each of the horizontal driving beams 130A and 130B, a driving voltage with a first waveform and a driving voltage with a second waveform obtained by vertically inverting the first waveform with reference to the median value of the first waveform are applied to horizontal driving sources 131A/131B on each adjacent pair of horizontal beams 133A1, 133A2, 133A3, 133A4, 133B1, 133B2, 133B3, 133B4 to cause the adjacent pair of horizontal beams to warp in opposite vertical directions, and the accumulation of the vertical movement of the horizontal beams is transmitted to the mirror support 120. With the movement of the horizontal driving beams 130A and 130B, the mirror 110 and the mirror support 120 rotate (or oscillate) around the horizontal-rotation axis AXH. The direction of this rotation (or oscillation) is referred to as a horizontal direction, and the axis of this rotation (or oscillation) that passes through the center of the light reflection surface of the mirror 110 is referred to as the horizontal-rotation axis AXH. For example, nonresonant oscillation may be used for the horizontal driving by the horizontal driving beams 130A and 130B.

For example, the horizontal driving source 131A includes horizontal driving sources 131A1, 131A2, 131A3, and 131A4 that are formed on the first through fourth horizontal beams 133A1, 133A2, 133A3, and 133A4 constituting the horizontal driving beam 130A. The horizontal driving source 131B includes horizontal driving sources 131B1, 131B2, 131B3, and 131B4 that are formed on the first through fourth horizontal beams 133B1, 133B2, 133B3, and 133B4 constituting the horizontal driving beam 130B. In this case, the mirror 110 and the mirror support 120 can be rotated in the horizontal direction by driving the horizontal driving sources 131A1, 131B1, 131A3, and 131B3 using the first waveform and driving the horizontal driving sources 131A2, 131B2, 131A4, and 131B4 using the second waveform that is obtained by vertically inverting the first waveform with reference to the median value of the first waveform.

On the upper surfaces of the vertical driving beams 170A and 170B, the vertical driving sources 171A and 171B are formed for respective vertical beams that are rectangular units including no curved section. Each vertical driving source 171A is a piezoelectric element formed on the upper surface of the vertical driving beam 170A and includes a piezoelectric thin film, an upper electrode formed on the upper surface of the piezoelectric thin film, and a lower electrode formed on the lower surface of the piezoelectric thin film. Each vertical driving source 171B is a piezoelectric element formed on the upper surface of the vertical driving beam 170B and includes a piezoelectric thin film, an upper electrode formed on the upper surface of the piezoelectric thin film, and a lower electrode formed on the lower surface of the piezoelectric thin film.

In each of the vertical driving beams 170A and 170B, a driving voltage with a first waveform and a driving voltage with a second waveform obtained by vertically inverting the first waveform with reference to the median value of the first waveform are applied to vertical driving sources 171A/171B on adjacent vertical beams to cause the adjacent vertical beams to warp in opposite vertical directions, and the accumulation of the vertical movement of the vertical beams is transmitted to the movable frame 160. With the movement of the vertical driving beams 170A and 170B, the mirror 110 and the mirror support 120 rotate (or oscillate) around a rotation axis that is orthogonal to the horizontal-rotation axis AXH. The direction of this rotation (or oscillation) is referred to as a vertical direction, and this rotation axis that passes through the center of the light reflection surface of the mirror 110 is referred to as a vertical-rotation axis AXV. For example, nonresonant oscillation may be used for the vertical driving by the vertical driving beams 170A and 170B.

For example, the vertical driving source 171A includes vertical driving sources 171A1 and 171A2 that are formed on the first and second vertical beams constituting the vertical driving beam 170A. The vertical driving source 171B includes vertical driving sources 171B1 and 171B2 that are formed on the first and second vertical beams constituting the vertical driving beam 170B. In this case, the movable frame 160 connected to the mirror 110 can be rotated in the vertical direction by driving the vertical driving sources 171A1 and 171B1 using the first waveform and driving the vertical driving sources 171A2 and 171B2 using the second waveform that is obtained by vertically inverting the first waveform with reference to the median value of the first waveform.

In the optical scanning device of the present embodiment, the MEMS structure implementing the actuator is formed of, for example, a silicon-on-insulator (SOI) substrate including a support layer, a buried oxide (BOX) layer, and an active layer. Each of the fixed frame 180 and the movable frame 160 is comprised of the support layer, the BOX layer, and the active layer. On the other hand, each of components such as the horizontal driving beams 130A and 130B and the vertical driving beams 170A and 170B other than the fixed frame 180 and the movable frame 160 may be comprised of the active layer alone (one layer) or comprised of the BOX layer and the active layer (two layers).

In the optical scanning device of the present embodiment, a rib 112 is formed on the lower surface of the mirror support 120 that is opposite a surface of the mirror support 120 on which the mirror 110 is formed. The rib 112 formed on the lower surface of the mirror support 120 is provided to improve the rigidity of the mirror support 120.

In the optical scanning device of the present embodiment, the horizontal driving sources 131A and 131B are formed on first surfaces (upper surfaces) of the horizontal beams constituting the horizontal driving beams 130A and 130B, and ribs 132 are formed on second surfaces (lower surfaces) of the horizontal beams. The ribs 132 are positioned in the middle of the horizontal beams, i.e., along the horizontal-rotation axis AXH. Each rib 132 has a width in the longitudinal direction of the horizontal beam and a length in the lateral direction of the horizontal beam, and the width of the rib 132 is shorter than the length of the rib 132. For example, when a wafer including multiple MEMS structures is diced to manufacture separate MEMS structures, the ribs 132 formed on the second surfaces (lower surfaces) of the horizontal beams constituting the horizontal driving beams 130A and 130B can prevent the bellows structures from being excessively vibrated and damaged by a water flow and vibration generated during the dicing.

Also in the optical scanning device of the present embodiment, the vertical driving sources 171A and 171B are formed on first surfaces (upper surfaces) of the vertical beams constituting the vertical driving beams 170A and 170B, and ribs 172 are formed on second surfaces (lower surfaces) of the vertical beams. Each of the ribs 172 is positioned such that a distance from the joint between the corresponding one of the vertical beams and the corresponding one of the turnaround parts 171X and 171Y becomes 10% to 20% of the length of the vertical beams. Each rib 172 has a width in the longitudinal direction of the vertical beam and a length in the lateral direction of the vertical beam, and the width of the rib 172 is shorter than the length of the rib 172. The ribs 172 formed on the second surfaces (lower surfaces) of the vertical beams constituting the vertical driving beams 170A and 170B can prevent the vertical driving beams 170A and 170B from unnecessarily warping in a direction (the width or lateral direction of the vertical beams) that is orthogonal to the direction of vertical warping of the vertical driving beams 170A and 170B and can reduce the displacement of the mirror support 120 in the thickness direction.

The height (or thickness) of the rib 112 formed on the lower surface of the mirror support 120, which is opposite the surface of the mirror support 120 on which the mirror 110 is formed, is the same as the height (or thickness) of the fixed frame 180 and the movable frame 160. When the MEMS structure that functions as an actuator of the optical scanning device is formed of an SOI substrate, the rib 112 is formed of the BOX layer and the support layer on the lower surface of the mirror support 120 formed of the active layer. The horizontal beams constituting the horizontal driving beams 130A and 130B are formed of the active layer, and the ribs 132 formed on the second surfaces (lower surfaces) of the horizontal beams are formed of the BOX layer and the support layer. The vertical beams constituting the vertical driving beams 170A and 170B are formed of the active layer, and the ribs 172 formed on the second surfaces (lower surfaces) of the vertical beams are formed of the BOX layer and the support layer. Instead of using the support layer of an SOI substrate, the ribs may be formed as steps by etching bulk silicon.

Figure 3:
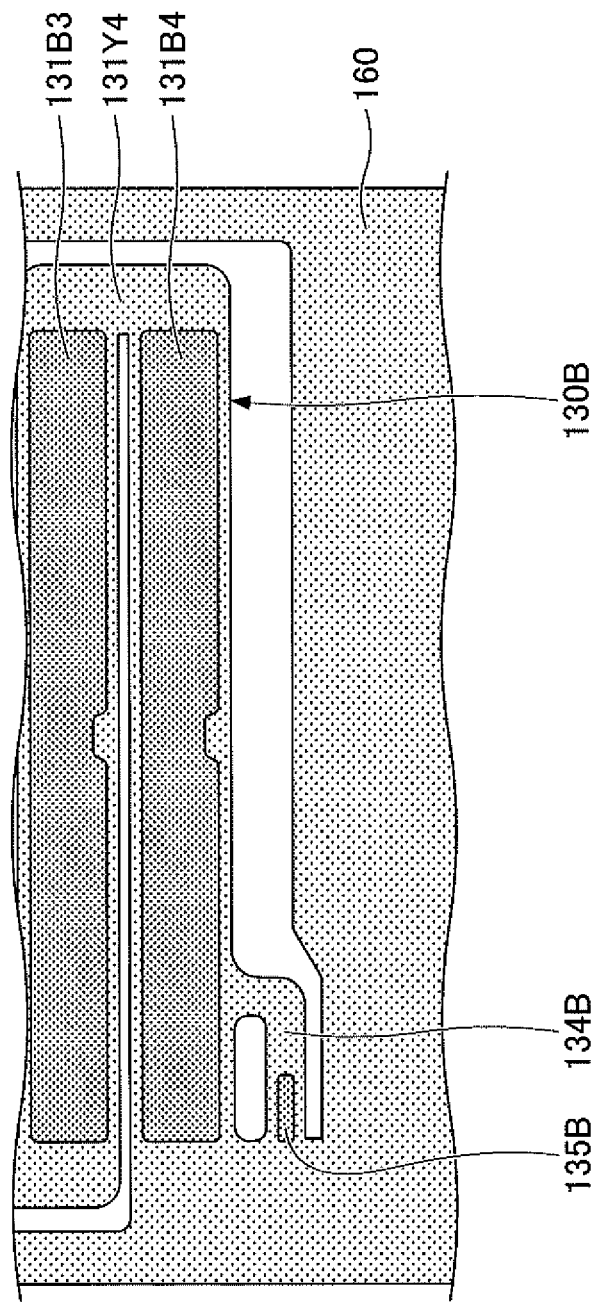
FIG. 3 is an enlarged view of a portion of the optical scanner of FIG. 2.

FIG. 3 is an enlarged view of a region MA of the optical scanner 100 that is surrounded by a dotted line in FIG. 2. The optical scanner 100 further includes a sensor beam 134B that extends in a direction that is the same as the direction in which the horizontal beam 133J4 (see FIG. 1B) constituting a part of the horizontal driving beam 130B extends. An end of the sensor beam 134B is connected to a lateral side of the horizontal beam 133B4. Another end of the sensor beam 134B is connected to an inner side of the movable frame 160. Thus, the horizontal driving source 131J4 is formed on the first surface (upper surface) of the horizontal beam 133J4 constituting a part of the horizontal driving beam 130B, and a sensor piezoelectric element 135B is formed on a first surface (upper surface) of the sensor beam 134B that is on the same side as the first surface of the horizontal beam 133B4 (i.e., the first surface of the sensor beam 134B and the first surface of the horizontal beam 133J4 face the same direction). The sensor piezoelectric element 135B may be simply referred to as a sensor. The sensor piezoelectric element 135B detects the displacement such as a warp of the horizontal beam 133J4 to which the sensor beam 134B is connected.

As described above, in the optical scanner 100 of the present embodiment, the sensor piezoelectric element 135B is provided on the sensor beam 134B that branches from the horizontal beam 133J4 on which the horizontal driving source 131J4 is formed. This configuration makes it possible to provide the sensor piezoelectric element 135B to detect a warp of the horizontal driving beam 130B (the horizontal beam 133B4) without sacrificing the area of the horizontal driving source 131B4 implemented by a piezoelectric element. Also, the sensor piezoelectric element 135B can detect the driving state of the horizontal driving beam 130B (the horizontal beam 133B4).

Similarly, the optical scanner 100 includes a sensor beam 134A that extends in a direction that is the same as the direction in which the horizontal beam 133A4 (see FIG. 1B) constituting a part of the horizontal driving beam 130A extends. An end of the sensor beam 134A is connected to a lateral side of the horizontal beam 133A4. Another end of the sensor beam 134A is connected to an inner side of the movable frame 160. Thus, the horizontal driving source 131A4 is formed on the first surface (upper surface) of the horizontal beam 133A4 constituting a part of the horizontal driving beam 130A, and a sensor piezoelectric element 135A is formed on a first surface (upper surface) of the sensor beam 134A that is on the same side as the first surface of the horizontal beam 133A4. This configuration makes it possible to provide the sensor piezoelectric element 135A to detect a warp of the horizontal driving beam 130A (the horizontal beam 133A4) without sacrificing the area of the horizontal driving source 131A4 implemented by a piezoelectric element. Also, the sensor piezoelectric element 135A can detect the driving state of the horizontal driving beam 130A (the horizontal beam 133A4).

Figure 4A:
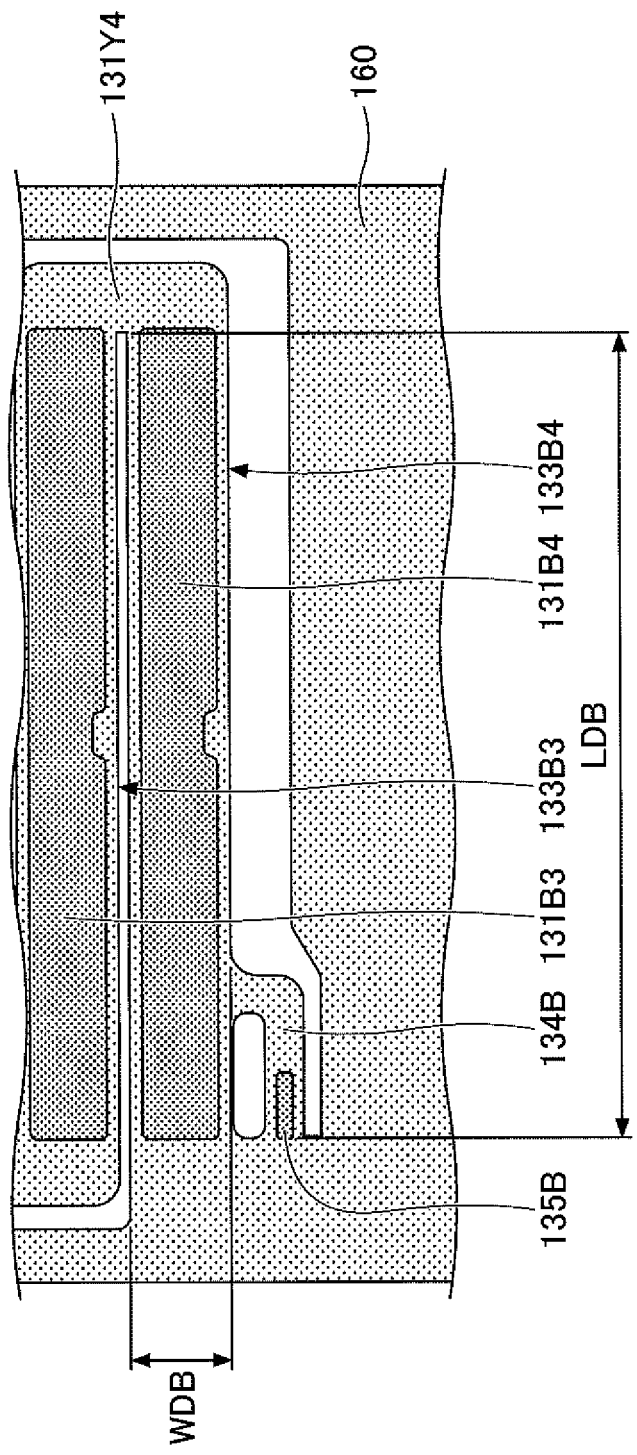
FIG. 4A is an enlarged view of a portion of the optical scanner of FIG. 2.

FIG. 4A is an enlarged view of a portion of the optical scanner 100 of FIG. 2, and FIG. 4B is an enlarged view of a portion of the optical scanner 100 of FIG. 4A. As illustrated in FIG. 4A, the horizontal beam 133B4 has a length LDB in the longitudinal direction. Also, as illustrated in FIG. 4B, the sensor beam 134B has a length LSB in a direction that is the same as the longitudinal direction of the horizontal beam 133B4, and has a width WSB in the lateral direction that is orthogonal to the longitudinal direction. One end of the sensor beam 134B is connected via a connecting part having a length LC in the longitudinal direction to a lateral side of the horizontal beam 133B4. Another end of the sensor beam 134B is connected to an inner side of the movable frame 160. The horizontal driving source 131B4 is formed on the first surface of the horizontal beam 133B4 constituting a part of the horizontal driving beam 130B, and the sensor piezoelectric element 135B is formed on the first surface of the sensor beam 134B that is on the same side as the first surface of the horizontal beam 133B4. The sensor piezoelectric element 135B has a substantially-rectangular shape, has a length LS in a direction that is the same as the longitudinal direction of the horizontal beam 133B4, and has a width WS in the lateral direction that is orthogonal to the longitudinal direction.

In FIGS. 4A and 4B, a narrow sensor beam 134B branches from the horizontal beam 133B4 at a position near the end of the horizontal beam 133B4, and the sensor piezoelectric element 135B for detecting the warp of the horizontal beam 133B4 is mounted on the sensor beam 134B. The distance in the beam width direction between the sensor piezoelectric element 135B and the horizontal driving source 131B4 on the horizontal beam 133B4 is preferably a minimum distance that is necessary to perform etching, and also a silicon portion (the active layer of the SOI substrate) is preferably removed as much as possible. The width WSB of the branching sensor beam 134B is preferably a minimum width that is necessary to accommodate the sensor piezoelectric element 135B with the width WS. If the width WSB of the sensor beam 134B is too large relative to the width WS of the sensor piezoelectric element 135B, it becomes difficult to reduce the size of the optical scanning device.

Also, because the sensor beam 134B has a minimum width necessary to accommodate the sensor piezoelectric element 135B, the sensor beam 134B does not greatly influence the warping of the horizontal beam 133B4.

The sensor piezoelectric element 135B is disposed on a side of the sensor beam 134B that is closer to the movable frame 160. The end of the sensor piezoelectric element 135B closer to the movable frame 160 is preferably in the same position as the joint between the horizontal beam 133B4 and the movable frame 160. With this configuration, when a voltage is applied to the horizontal driving source 131B4 to cause the horizontal beam 133B4 to warp, the branching sensor beam 134B also warps. As a result, distortion is generated in the sensor piezoelectric element 135B, and the sensor piezoelectric element 135B can detect a voltage that is generated according to the warp of the horizontal beam 133B4.

The length LSB of the sensor beam 134B in the longitudinal direction of the horizontal beam 133B4 is preferably 1.5 to 2 times greater than the length LS of the sensor piezoelectric element 135B in the longitudinal direction of the horizontal beam 133B4. This configuration makes it possible to increase the sensitivity (the output voltage per 1 degree in the rotational direction around the horizontal-rotation axis) of the sensor piezoelectric element 135B.

For example, when the length LDB of the horizontal beam 133B4 in the longitudinal direction is 3.4 mm, the length LSB of the sensor beam 134B is 0.55 mm, and the length LC of the connecting part connecting the horizontal beam 133B4 to the sensor beam 134B is 0.15 mm. For example, when a width WDB of the horizontal beam 133B4 is 0.46 mm, the width WSB of the sensor beam 134B is 0.18 mm, the width WS of the sensor piezoelectric element 135B is 0.1 mm, and the length LS of the sensor piezoelectric element 135B is 0.3 mm.

Figure 5A:
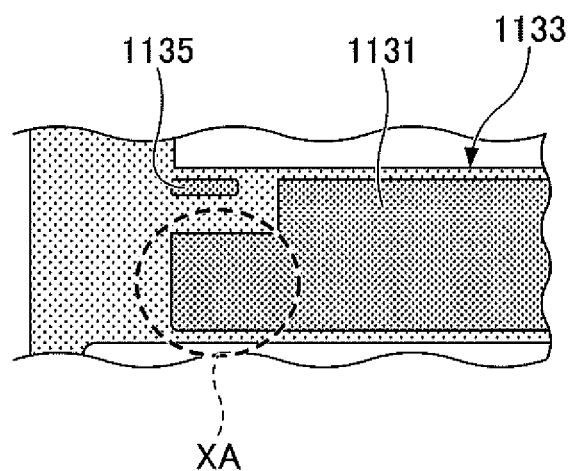
FIG. 5A is a drawing illustrating a portion of an optical scanner of an optical scanning device according to a comparative example.
Figure 5B:
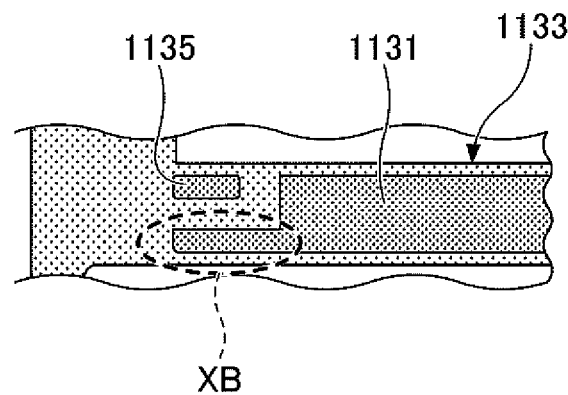
FIG. 5B is a drawing illustrating a portion of an optical scanner of an optical scanning device according to a comparative example.

FIG. 5A is a drawing illustrating a portion of an optical scanner of an optical scanning device according to a first comparative example, and FIG. 5B is a drawing illustrating a portion of an optical scanner of an optical scanning device according to a second comparative example. In the configuration of FIG. 5A, a sensor piezoelectric element 1135 is formed in a sensor area on a driving beam 1133 formed by removing a portion of a driving piezoelectric element 1131. Because the sensor area is formed by etching a portion of the driving piezoelectric element 1131, the size of the sensor area tends to become greater than the size of the sensor piezoelectric element 1135. In the case of FIG. 5A, the driving piezoelectric element 1131 has a sufficiently-large width relative to the size of the sensor area. Because a sufficiently-large portion XA of the driving piezoelectric element 1131 remains on a side of the sensor piezoelectric element 1135 in the width direction of the driving beam 1133, the portion XA of the driving piezoelectric element 1131 can also deform the sensor piezoelectric element 1135.

On the other hand, in the configuration of FIG. 5B, the driving piezoelectric element 1131 does not have a sufficiently-large width relative to the size of the sensor area. Because a portion XB of the driving piezoelectric element 1131 remaining on a side of the sensor piezoelectric element 1135 in the width direction of the driving beam 1133 is not sufficiently large, the portion XB of the driving piezoelectric element 1131 cannot sufficiently deform the sensor piezoelectric element 1135.

The above configuration of the optical scanning device of the present embodiment makes it possible to provide the sensor piezoelectric element 135B to detect the warp of the horizontal driving beam 1308 (the horizontal beam 133B4) without sacrificing the area of the horizontal driving source 131B4 (driving piezoelectric element). Accordingly, the horizontal driving source 131B4 (driving piezoelectric element) can sufficiently deform the sensor piezoelectric element 135B.

As illustrated in FIG. 1, in the optical scanner 100 of the optical scanning device of the present embodiment, sensor piezoelectric elements 195 and 196 are also provided on vertical beams constituting parts of the vertical driving beams 170A and 170B. On the vertical beam, the sensor piezoelectric element is placed in a sensor area formed by removing a portion of the driving piezoelectric element as illustrated in FIG. 5A. With the configuration of FIG. 5A, the width of the vertical beam is sufficiently large relative to the size of the sensor piezoelectric element, and a portion of the driving piezoelectric element on a side of the sensor piezoelectric element in the width direction of the driving beam can sufficiently deform the sensor piezoelectric element.

Variation

Figure 6:
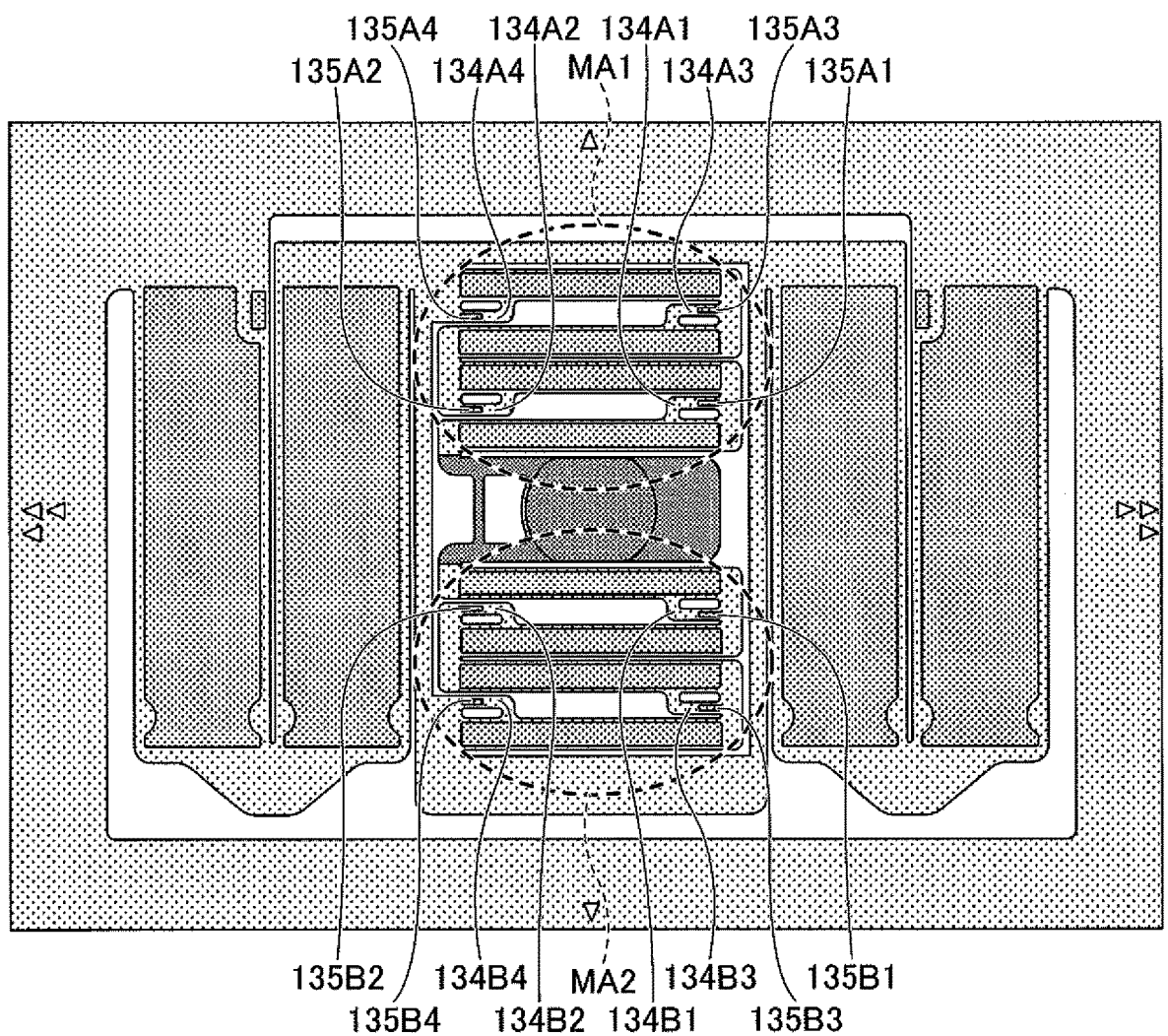
FIG. 6 is a top plan view of an optical scanner of an optical scanning device according to a variation.

FIG. 6 is a top plan view of an optical scanner of an optical scanning device according to a variation. In the optical scanner of the optical scanning device illustrated in FIG. 6, sensor beams 134A1, 134A2, 134A3, 134A4, 134B1, 134B2, 134B3, and 13434 are formed for the respective horizontal beams 133A1, 133A2, 133A3, 133A4, 133B1, 133B2, 133B3, and 133B4 constituting the horizontal driving beams 130A and 130B. Also, sensor piezoelectric elements 135A1, 135A2, 135A3, 135A4, 135B1, 135B2, 135B3, and 135B4 are formed on the corresponding sensor beams 134A1, 134A2, 134A3, 134A4, 134B1, 134B2, 134B3, and 134B4. Thus, in FIG. 6, sensor beams and sensor piezoelectric elements are formed for respective horizontal beams in regions MA1 and MA2 indicated by dotted lines.

First ends of the sensor beams 134A1, 134A2, 134A3, 134A4, 134B1, 13432, 134B3, and 134B4 are connected to lateral sides of the corresponding horizontal beams 133A1, 133A2, 133A3, 133A4, 133B1, 133B2, 133B3, and 133B4, and second ends of the sensor beams are connected to the inner side of the movable frame.

This configuration makes it possible to provide the sensor piezoelectric elements 135A1, 135A2, 135A3, 135A4, 135B1, 135B2, 135B3, and 135B4 without sacrificing the areas of the horizontal driving sources 131A1, 131A2, 131A3, 131A4, 131B1, 131B2, 131B3, and 131B4. With this configuration, each of the sensor piezoelectric elements 135A1, 135A2, 135A3, 135A4, 135B1, 135B2, 135B3, and 135B4 can detect the warp of the corresponding one of the horizontal beams 133A1, 133A2, 133A3, 133A4, 133B1, 133B2, 133B3, and 133B4. Also, the horizontal beams 133A1, 133A2, 133A3, 133A4, 133B1, 133B2, 133B3, and 133B4 can sufficiently deform the corresponding sensor piezoelectric elements 135A1, 135A2, 135A3, 135A4, 135B1, 135B2, 135B3, and 135B4.

Example 1

Figure 7A:
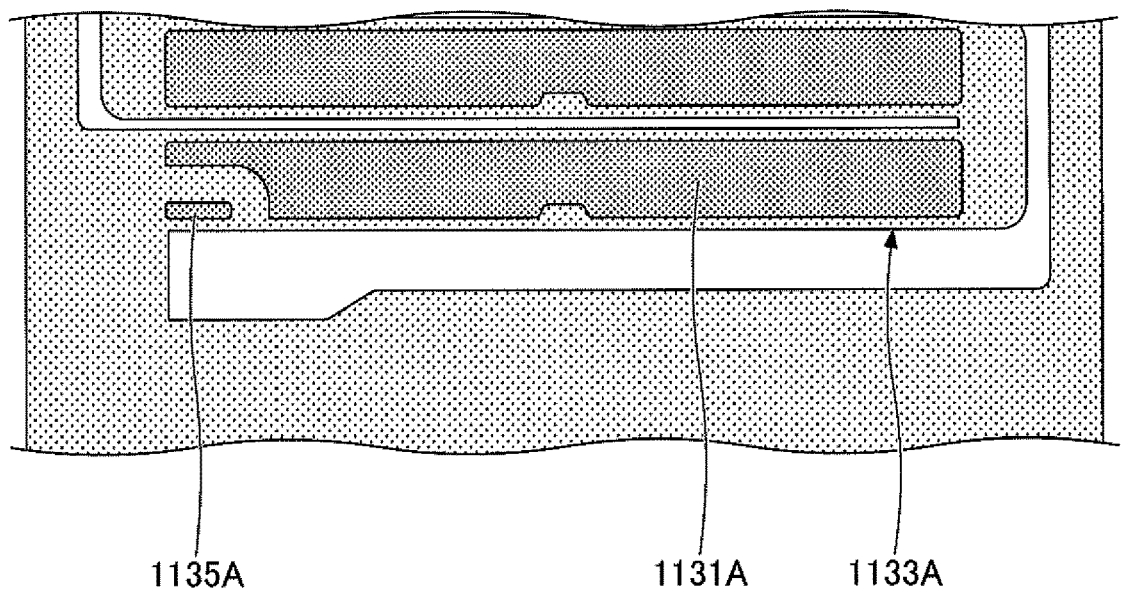
FIG. 7A is a drawing illustrating a portion of an optical scanner of an optical scanning device according to a comparative example.

FIG. 7A is a drawing illustrating a portion of an optical scanner of an optical scanning device according to a third comparative example. In the configuration of FIG. 7A, a driving piezoelectric element 1131A is formed on a driving beam 1133A, and a sensor piezoelectric element 1135A is formed in a sensor area formed by removing a portion of the driving piezoelectric element 1131A.

Figure 7B:
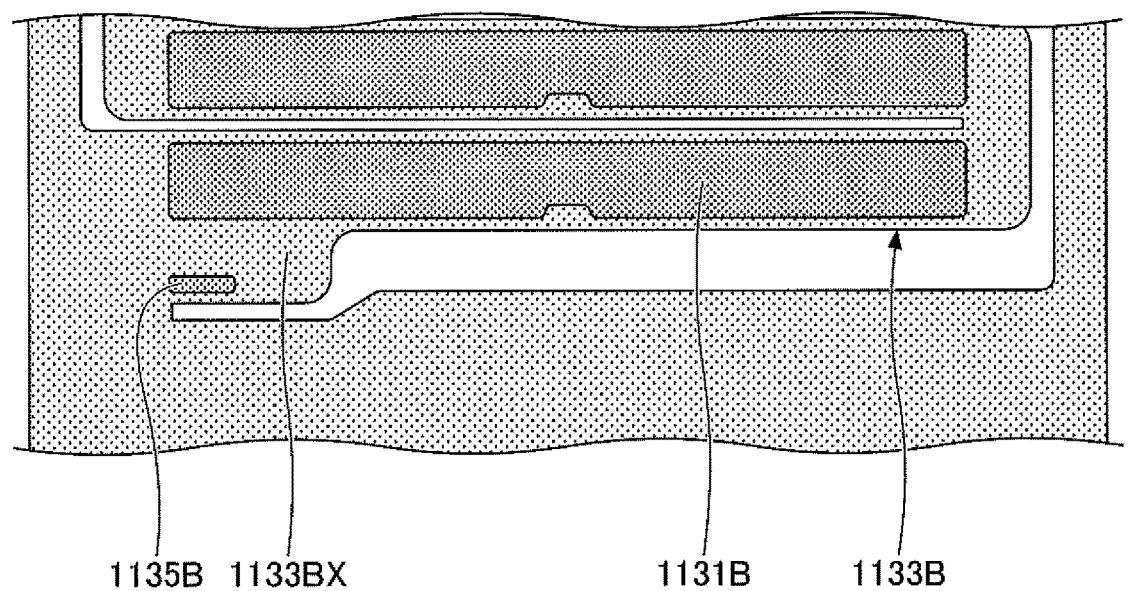
FIG. 7B is a drawing illustrating a portion of an optical scanner of an optical scanning device according to a reference example.

FIG. 7B is a drawing illustrating a portion of an optical scanner of an optical scanning device according to a reference example. In the configuration of FIG. 7B, a driving piezoelectric element 1131B is formed on a driving beam 1133B, a protrusion 1133BX is formed to protrude from the lateral side of the driving beam 1133B, and a sensor piezoelectric element 1135B is formed on the protrusion 1133BX.

Figure 7C:
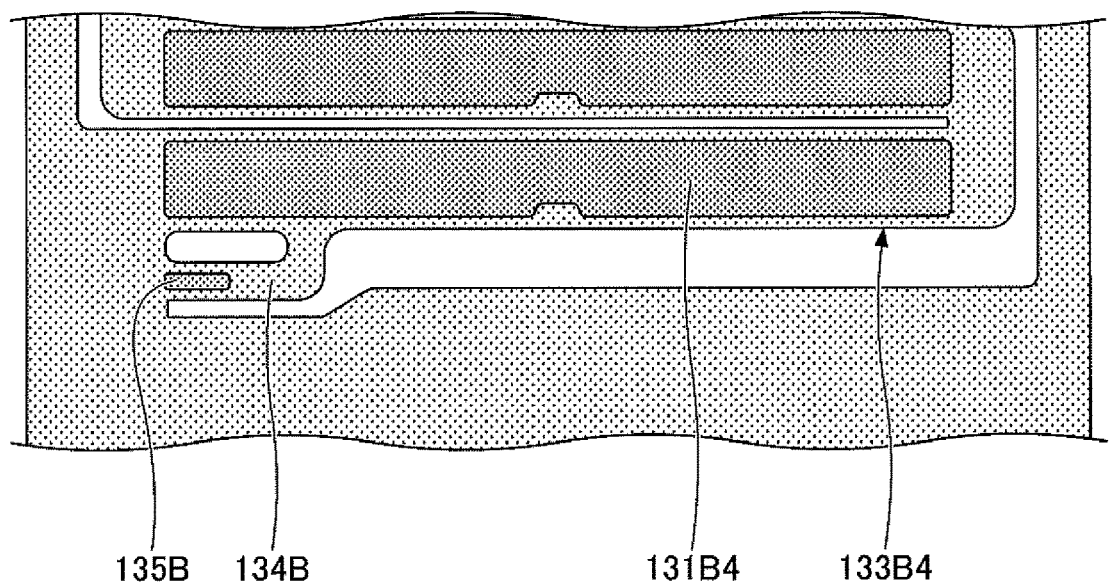
FIG. 7C is a drawing illustrating a portion of an optical scanner of an optical scanning device according to an embodiment.

FIG. 7C is a drawing illustrating a portion of the optical scanner 100 of the optical scanning device according to the above embodiment. In the configuration of FIG. 7C, the horizontal driving source (driving piezoelectric element) 131B4 is formed on the horizontal beam (driving beam) 133B4, the sensor beam 134B is formed to branch from the horizontal beam (driving beam) 133B4, and the sensor piezoelectric element 135B is formed on the sensor beam 134B.

Figure 8:
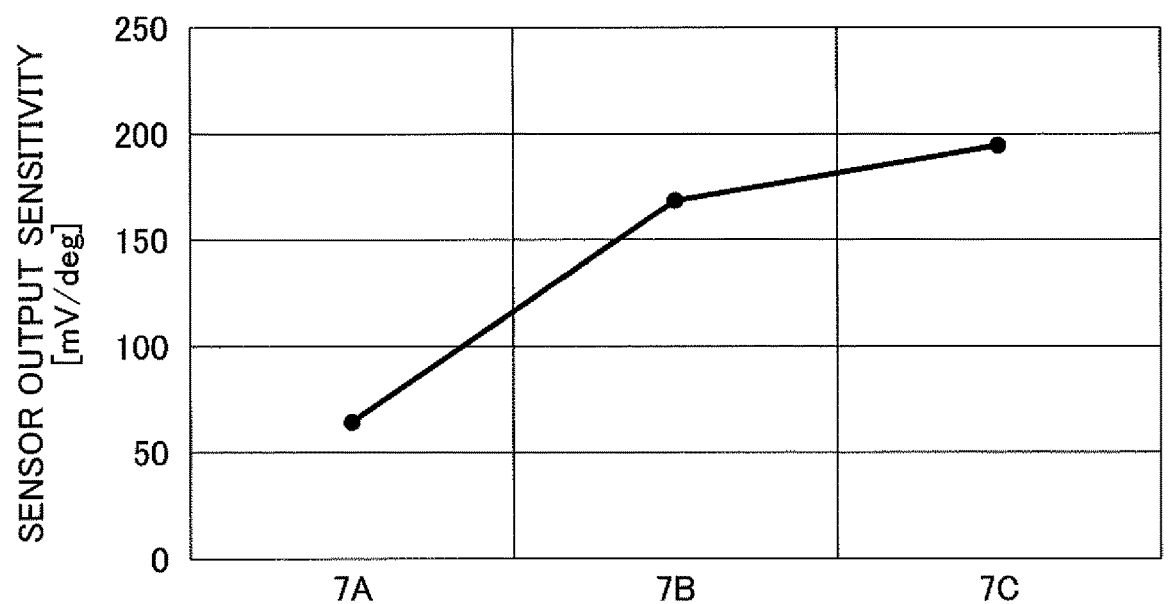
FIG. 8 is a graph indicating sensor output sensitivity of optical scanning devices according to the comparative example (7A), the reference example (7B), and the embodiment (7C)

Sensor output sensitivity and tilt angle sensitivity of the optical scanning devices according to the third comparative example (7A), the reference example (7B), and the embodiment (7C) are calculated through a simulation. FIG. 8 is a graph indicating sensor output sensitivity of the optical scanning devices according to the third comparative example (7A), the reference example (7B), and the embodiment (7C). The sensor output sensitivity is represented by an output voltage per 1 degree in the rotational direction around the horizontal-rotation axis. The sensor output sensitivity of the reference example (7B) is greater than that of the third comparative example (7A), and the sensor output sensitivity of the embodiment (7C) is greater than that of the reference example (7B).

Figure 9:
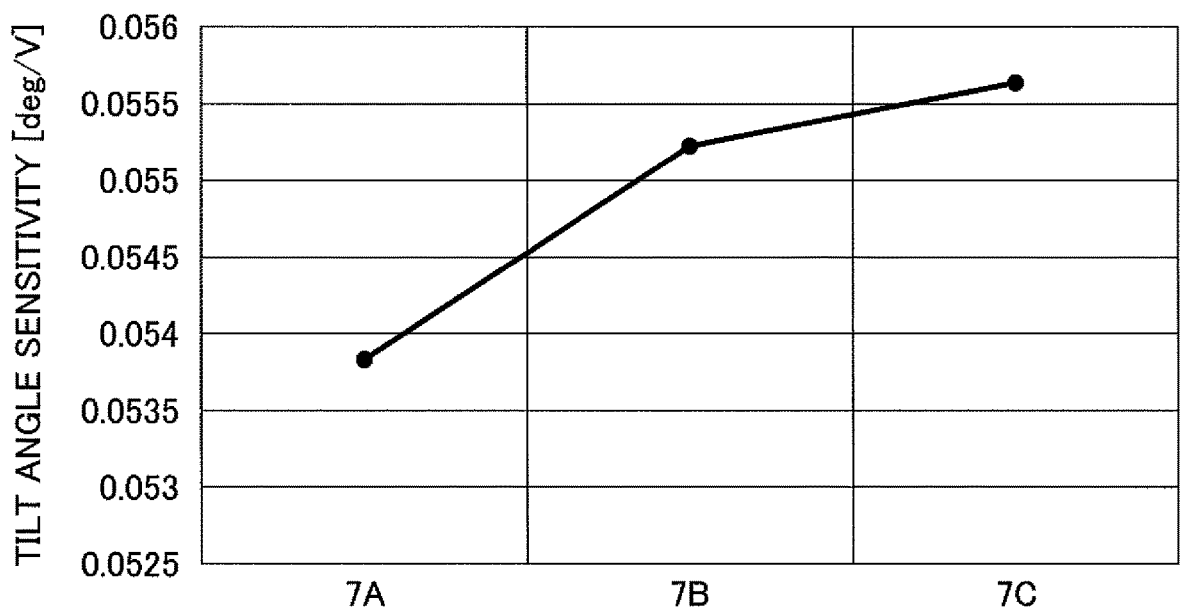
FIG. 9 is a graph indicating tilt angle sensitivity of optical scanning devices according to the comparative example (7A), the reference example (7B), and the embodiment (7C)

FIG. 9 is a graph indicating tilt angle sensitivity of the optical scanning devices according to the third comparative example (7A), the reference example (7B), and the embodiment (7C). The tilt angle sensitivity is represented by an angle per 1 voltage in the rotational direction around the horizontal-rotation axis. The tilt angle sensitivity of the reference example (7B) is greater than that of the third comparative example (7A), and the tilt angle sensitivity of the embodiment (7C) is greater than that of the reference example (7B).

Example 2

Figure 10:
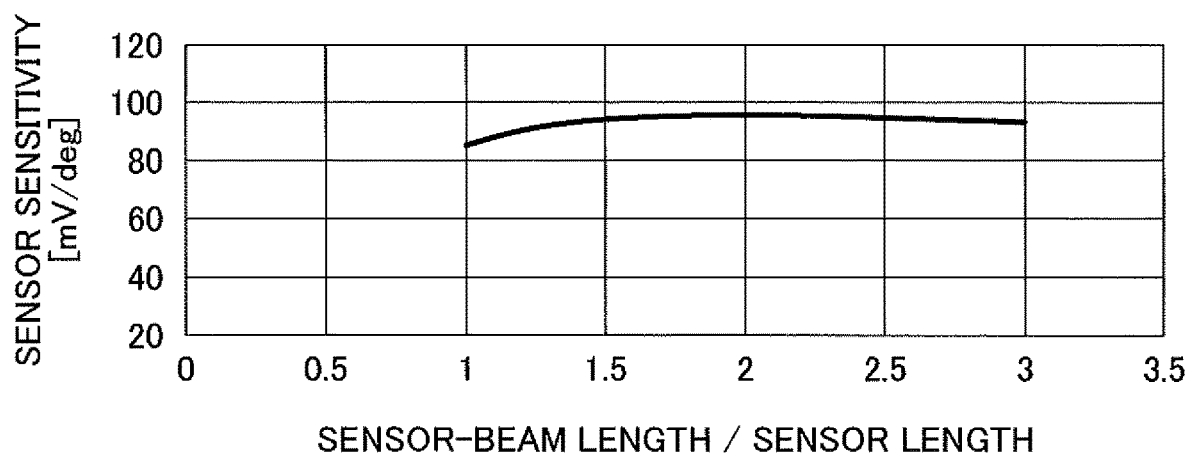
FIG. 10 is a graph indicating sensor sensitivity (sensor output) relative to a sensor beam length of the optical scanning device according to the embodiment.

Sensor sensitivity (sensor output) relative to the sensor beam length of the optical scanning device of the above embodiment is calculated through a simulation. FIG. 10 is a graph indicating sensor sensitivity (sensor output) relative to the sensor beam length of the optical scanning device according to the embodiment. In FIG. 10, the horizontal axis indicates "sensor beam length/sensor length", and the vertical axis indicates sensor output sensitivity (sensor output) that is represented by an output voltage per 1 degree in the rotational direction around the horizontal-rotation axis. The sensor beam length (the length of the sensor beam) is preferably 1.5 to 2 times greater than the sensor length (the length of the sensor piezoelectric element). This configuration makes it possible to increase the sensor sensitivity. In a range where the sensor beam length is less than 1.5 times the sensor length, the sensor sensitivity decreases as the sensor beam length decreases. Also, in a range where the sensor beam length is greater than 2 times the sensor length, the sensor sensitivity does not greatly change even if the sensor beam length is increased. Accordingly, the sensor beam preferably has a minimum length that is necessary to achieve desired sensor sensitivity, and the sensor beam length is preferably less than or equal to two times the sensor length.

As described above, in the optical scanner 100 of the optical scanning device of the present embodiment, the sensor piezoelectric element 135B is provided on the sensor beam 134B that branches from the horizontal beam (driving beam) 133B4 on which the horizontal driving source (driving source) 131B4 is formed. This configuration makes it possible to provide the sensor piezoelectric element 135B to detect the warp of the horizontal driving beam 130B (the horizontal beam 133B4) without sacrificing the area of the horizontal driving source (driving source) 131B4 implemented by a piezoelectric element. Also, the sensor piezoelectric element 135B can detect the driving state of the horizontal driving beam 130B (the horizontal beam 133B4).

An actuator and an optical scanning device according to embodiments of the present invention are described above. However, the present invention is not limited to the specifically disclosed embodiments, and variations and modifications may be made without departing from the scope of the present invention. For example, although an actuator is used for an optical scanning device including a mirror in the above embodiments, the actuator may also be used to drive an object other than a mirror, and the present invention may also be applied to a device that does not include a mirror. An optical scanning device according to an embodiment of the present invention is preferably used for an optical coherence tomography device of a funduscope. In an optical coherence tomography device of a funduscope, resonant driving is not necessary because one of the axes operates at high speed as in a projector, and it is desired that tilt angles can be freely set and adjusted to perform optical scanning. Accordingly, an optical scanner where nonresonant driving is used for both of two axes as in the above embodiments is preferably used for an optical coherence tomography device of a funduscope. An optical scanning device according to an embodiment of the present invention may also be used for a projection device.

What is claimed is:

1. An actuator, comprising:
   a driving beam that includes a beam extending in a direction orthogonal to a predetermined axis and supports an object to be driven;
   a driving source that is formed on a surface of the beam and causes the object to rotate around the predetermined axis;
   a sensor beam including a first portion that protrudes from a lateral side of the beam at an intermediate position in a longitudinal direction of the beam and a second portion that extends from an end of the first portion in a direction that is same as the direction in which the beam extends such that a space is formed between the second portion and the lateral side of the beam; and
   a sensor that is formed on a surface of the sensor beam, the surface of the sensor beam and the surface of the beam facing a same direction.

2. The actuator as claimed in claim 1, wherein the sensor detects displacement of the beam from which the first portion of the sensor beam protrudes.

3. The actuator as claimed in claim 1, further comprising:
   a frame to which the driving beam is connected,
   wherein an end of the second portion of the sensor beam is connected to the frame.

4. The actuator as claimed in claim 3, wherein the sensor is disposed on a side of the second portion of the sensor beam that is closer to the frame.

5. The actuator as claimed in claim 1, wherein a length of the sensor beam in a longitudinal direction of the beam is 1.5 to 2 times greater than a length of the sensor in the longitudinal direction of the beam.

6. The actuator as claimed in claim 1, wherein
   the driving beam includes multiple beams extending in the direction orthogonal to the predetermined axis; and
   ends of each adjacent pair of the beams are connected to each other via a turnaround part such that the driving beam forms a zig-zag bellows structure as a whole.

7. The actuator as claimed in claim 1, wherein
   the driving beam includes multiple beams;
   sensor beams are formed for the respective beams; and
   the sensor is formed on each of the sensor beams.

8. An optical scanning device, comprising:
   a mirror support on which a mirror that reflects a laser beam is formed;
   a driving beam that includes a beam extending in a direction orthogonal to a predetermined axis and supports the mirror support;
   a driving source that is formed on a surface of the beam and causes the mirror support to rotate around the predetermined axis;
   a sensor beam including a first portion that protrudes from a lateral side of the beam at an intermediate position in a longitudinal direction of the beam and a second portion that extends from an end of the first portion in a direction that is same as the direction in which the beam extends such that a space is formed between the second portion and the lateral side of the beam; and a sensor that is formed on a surface of the sensor beam, the surface of the sensor beam and the surface of the beam facing a same direction.

9. An actuator, comprising:

a horizontal driving beam that includes horizontal beams extending in a direction orthogonal to a predetermined axis and supports an object to be driven, the horizontal beams being arranged in a direction parallel to the predetermined axis, and ends of each adjacent pair of the horizontal beams being connected to each other via a turnaround part such that the horizontal driving beam forms a zig-zag bellows structure as a whole;

driving sources that are formed on surfaces of the horizontal beams and cause the object to rotate around the predetermined axis;

a movable frame that supports the horizontal driving beam;

a vertical driving beam that includes vertical beams extending in the direction parallel to the predetermined axis, the vertical beams being arranged in the direction orthogonal to the predetermined axis, and ends of each adjacent pair of the vertical beams being connected to each other via a turnaround part such that the vertical driving beam forms a zig-zag bellows structure as a whole;

a fixed frame that supports the vertical driving beam, the movable frame being connected to the fixed frame via the vertical driving beam;

a sensor beam that extends in a direction that is same as the direction in which the horizontal beams extend, one end of the sensor beam being connected to a lateral side of one of the horizontal beams, another end of the sensor beam being connected to the movable frame; and a sensor that is formed on a surface of the sensor beam, the surface of the sensor beam and the surfaces of the horizontal beams facing a same direction, wherein a width of the sensor beam is less than a width of the horizontal beams, and the width of the horizontal beams is less than a width of the vertical beams.

* * * * *